(12) United States Patent
Jabusch

(10) Patent No.: US 11,866,000 B2
(45) Date of Patent: Jan. 9, 2024

(54) SEAT-BELT RETRACTOR

(71) Applicant: AUTOLIV DEVELOPMENT AB, Vargarda (SE)

(72) Inventor: Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 100 days.

(21) Appl. No.: 17/756,399

(22) PCT Filed: Nov. 25, 2020

(86) PCT No.: PCT/EP2020/083283
§ 371 (c)(1),
(2) Date: May 24, 2022

(87) PCT Pub. No.: WO2021/105159
PCT Pub. Date: Jun. 3, 2021

(65) Prior Publication Data
US 2023/0001882 A1   Jan. 5, 2023

(30) Foreign Application Priority Data
Nov. 26, 2019 (DE) ..................... 10 2019 218 307.7

(51) Int. Cl.
*B60R 22/34* (2006.01)
*B60R 22/46* (2006.01)
*B60R 22/44* (2006.01)

(52) U.S. Cl.
CPC .......... *B60R 22/3413* (2013.01); *B60R 22/46* (2013.01); *B60R 2022/444* (2013.01); *B60R 2022/4666* (2013.01)

(58) Field of Classification Search
CPC ........ B60Y 2400/73; B60R 2022/4666; B60R 2022/444; B60R 22/46; B60R 22/3413
See application file for complete search history.

(56) References Cited

U.S. PATENT DOCUMENTS 5,167,379 A * 12/1992 Jabusch ................ B60R 22/415
242/382.2
5,271,578 A * 12/1993 Jabusch ................ B60R 22/415
242/383.1
(Continued)

FOREIGN PATENT DOCUMENTS

DE          19927731 A1 * 12/2000 ......... B60R 22/3413
EP           1178906 B1      5/2004
(Continued)

*Primary Examiner* — Paul N Dickson
*Assistant Examiner* — Maxwell L Meshaka
(74) *Attorney, Agent, or Firm* — DICKINSON WRIGHT PLLC

(57) ABSTRACT

A seat-belt retractor comprising a seat-belt spindle which is rotatably mounted in a housing, an electric motor for driving the seat-belt spindle, and a gear mechanism that transmits the rotational motion from the electric motor to the seat-belt spindle, where the gear mechanism, when deactivated, can be driven as an assembly for driving the seat-belt spindle with a first torque; the seat-belt retractor has a first part, which, when a tensile force exerted by the seat-belt is exceeded, is driven in a rotational motion opposite to the rotational direction of the electric motor; and a braking device, which brakes the rotational motion of the first part, thereby actuating a blocking device blocking a second part of the gear mechanism, the blocking device activating the gear mechanism to transmit the rotational motion of the electric motor in a reduction ratio to the seat-belt spindle.

10 Claims, 4 Drawing Sheets

(56) References Cited

U.S. PATENT DOCUMENTS

Figure 1:
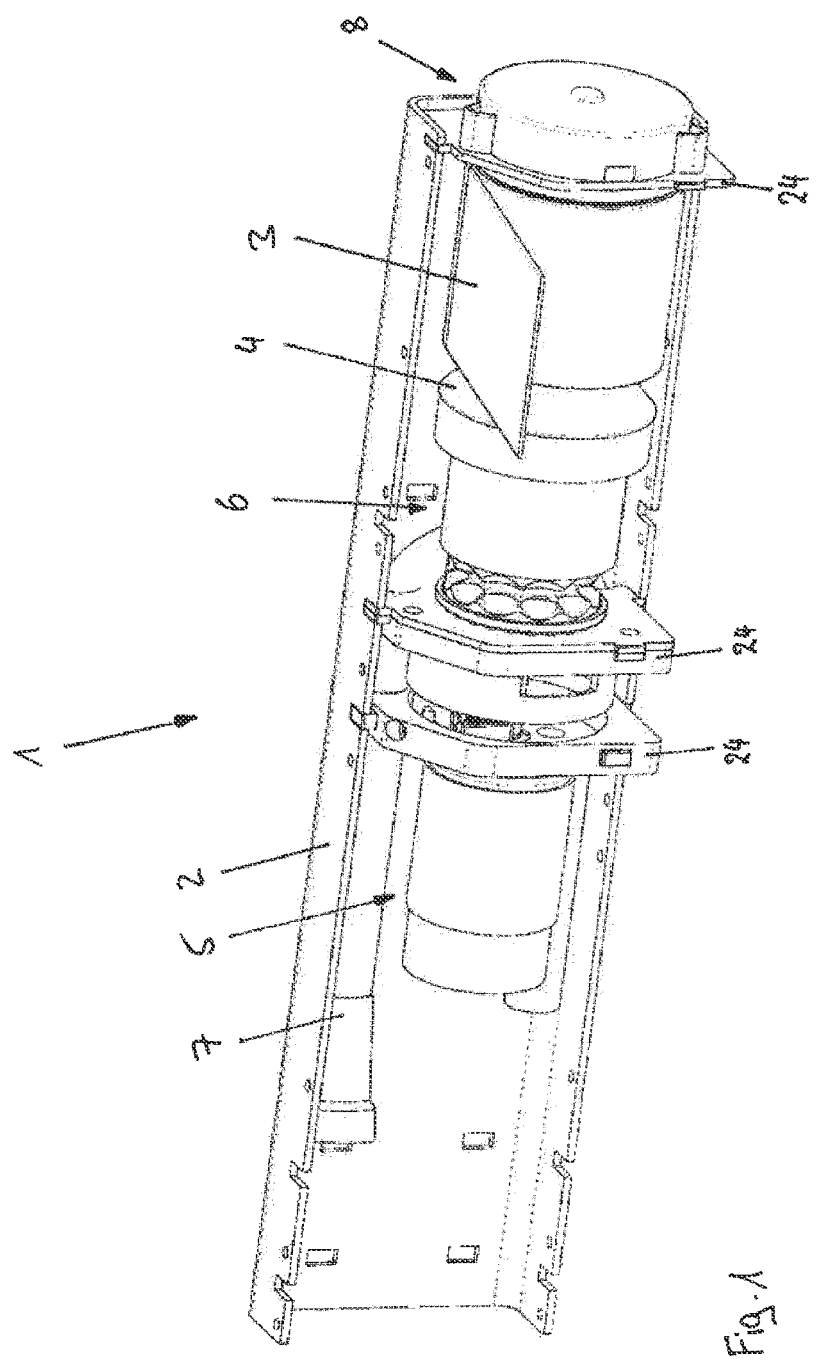

| | | | | |
|---|---|---|---|---|
| 5,529,258 | A * | 6/1996 | Dybro | B60R 22/46 242/374 |
| 5,628,471 | A * | 5/1997 | Jabusch | B60R 22/34 242/377 |
| 5,695,146 | A * | 12/1997 | Schmidt | G01P 15/036 242/384.1 |
| 5,775,620 | A * | 7/1998 | Jabusch | B60R 22/343 242/383.1 |
| 5,934,596 | A * | 8/1999 | Gorman | B60R 22/3413 242/384 |
| 5,944,277 | A * | 8/1999 | Jabusch | B60R 22/415 242/382.2 |
| 6,250,579 | B1 | 6/2001 | Bannert | B60R 22/3413 280/806 |
| 6,676,060 | B2 * | 1/2004 | Tanaka | B60R 22/3413 242/390.8 |
| 6,918,558 | B2 * | 7/2005 | Tanaka | B60R 22/46 242/390.8 |
| 7,021,582 | B2 * | 4/2006 | Tanaka | B60R 22/3413 242/390.8 |
| 7,090,161 | B2 * | 8/2006 | Mori | B60R 22/46 242/390.8 |
| 7,278,600 | B2 * | 10/2007 | Inuzuka | B60R 22/46 242/390.8 |
| 7,380,740 | B2 * | 6/2008 | Tanaka | B60R 22/46 242/390.8 |
| 7,392,959 | B2 * | 7/2008 | Inuzuka | B60R 22/46 242/390.9 |
| 7,416,151 | B2 * | 8/2008 | Mori | B60R 22/46 242/390.8 |
| 7,641,139 | B2 * | 1/2010 | Ng | B60R 22/46 242/382.5 |
| 7,690,688 | B2 * | 4/2010 | Clute | B60R 21/0152 280/806 |
| 8,292,209 | B2 * | 10/2012 | Saito | B60R 22/46 242/394.1 |
| 8,473,162 | B2 * | 6/2013 | Jabusch | B60R 22/28 701/45 |
| 8,528,848 | B2 * | 9/2013 | Ouchi | B60R 22/46 242/394 |
| 8,857,854 | B2 * | 10/2014 | Midorikawa | B60R 22/46 280/806 |
| 9,789,849 | B2 * | 10/2017 | Jabusch | B60R 22/44 |
| 9,834,173 | B2 * | 12/2017 | Michel | B60R 22/3413 |
| 9,884,605 | B2 * | 2/2018 | Singer | B60R 22/34 |
| 9,969,353 | B2 * | 5/2018 | Jabusch | B60R 22/38 |
| 10,189,440 | B2 * | 1/2019 | Suga | B60R 22/36 |
| 11,577,687 | B2 * | 2/2023 | Jabusch | B60R 22/3413 |
| 2001/0045483 | A1 | 11/2001 | Tanaka et al. | |
| 2004/0069891 | A1 * | 4/2004 | Tanaka | B60R 22/46 280/805 |
| 2004/0099759 | A1 * | 5/2004 | Tanaka | B60R 22/3413 280/806 |
| 2004/0108155 | A1 | 6/2004 | Mori et al. | |
| 2004/0188995 | A1 * | 9/2004 | Clute | B60R 21/0152 280/806 |
| 2005/0173580 | A1 * | 8/2005 | Lucht | B60R 22/46 280/807 |
| 2005/0224622 | A1 * | 10/2005 | Zolkower | B60R 22/3413 242/382 |
| 2005/0284978 | A1 * | 12/2005 | Zolkower | B60R 22/3413 242/379.1 |
| 2006/0071111 | A1 * | 4/2006 | Tanaka | B60R 22/46 242/390.8 |
| 2006/0108785 | A1 * | 5/2006 | Ehlers | B60R 22/34 280/801.1 |
| 2006/0175453 | A1 * | 8/2006 | Takao | B60R 22/46 280/807 |
| 2006/0237570 | A1 * | 10/2006 | Takao | B60R 22/44 242/382 |
| 2007/0085319 | A1 * | 4/2007 | Scherzinger | B60R 22/46 280/806 |
| 2007/0145175 | A1 * | 6/2007 | Clute | B60R 22/3413 242/379.1 |
| 2007/0200022 | A1 * | 8/2007 | Jabusch | B60R 22/3413 242/382 |
| 2008/0041651 | A1 * | 2/2008 | Ng | B60R 22/46 180/268 |
| 2009/0294565 | A1 * | 12/2009 | Ouchi | B60R 22/46 242/390.2 |
| 2011/0172054 | A1 * | 7/2011 | Jabusch | B60R 22/28 475/331 |
| 2011/0204173 | A1 * | 8/2011 | Saito | B60R 22/46 242/374 |
| 2012/0256032 | A1 * | 10/2012 | Evers | B60R 22/40 242/384 |
| 2013/0140391 | A1 * | 6/2013 | Jabusch | B60R 22/34 242/396 |
| 2013/0320127 | A1 * | 12/2013 | Singer | B60R 22/341 242/383 |
| 2015/0001331 | A1 * | 1/2015 | Michel | B60R 22/3413 242/396.2 |
| 2015/0083841 | A1 * | 3/2015 | Singer | B60R 22/3413 242/379.1 |
| 2015/0203070 | A1 * | 7/2015 | Singer | B60R 22/3413 242/381 |
| 2015/0367814 | A1 * | 12/2015 | Jabusch | B60R 22/44 242/372 |
| 2016/0229375 | A1 * | 8/2016 | Jabusch | B60R 22/3413 |
| 2017/0129450 | A1 * | 5/2017 | Suga | B60R 22/3413 |
| 2017/0129453 | A1 * | 5/2017 | Suga | B60R 22/36 |
| 2018/0154861 | A1 * | 6/2018 | Sugiyama | B60R 22/341 |
| 2020/0047711 | A1 * | 2/2020 | Jabusch | B60R 22/46 |
| 2020/0130641 | A1 * | 4/2020 | Jabusch | B60R 22/46 |
| 2021/0387593 | A1 * | 12/2021 | Jabusch | B60R 22/44 |
| 2022/0410837 | A1 * | 12/2022 | Rettig | B60R 22/03 |
| 2023/0001882 | A1 * | 1/2023 | Jabusch | B60R 22/3413 |
| 2023/0001883 | A1 * | 1/2023 | Jabusch | B60R 22/46 |
| 2023/0234533 | A1 * | 7/2023 | Jabusch | B60R 22/46 242/396.2 |
| 2023/0256933 | A1 * | 8/2023 | Söhnchen | B60R 22/34 242/390.9 |
| 2023/0278524 | A1 * | 9/2023 | Bud | B60R 22/4676 242/396.2 |

FOREIGN PATENT DOCUMENTS

| | | | |
|---|---|---|---|
| EP | 1498326 A1 | 1/2005 | |
| EP | 1504971 A2 | 2/2005 | |
| WO | WO-9702162 A1 * | 1/1997 | ......... B60R 22/3413 |
| WO | WO-03099619 A2 * | 12/2003 | ............ B60R 22/46 |
| WO | 2011148772 A1 | 12/2011 | |

* cited by examiner

SEAT-BELT RETRACTOR

The present invention relates to a belt retractor having the features of the preamble of Claim 1.

Belt retractors have as basic components a load-bearing frame and a belt reel that is rotatably mounted in the frame and onto which a safety belt can be wound. The frame serves not only for mounting the belt reel but also for fastening to a seat structure or to a vehicle structure and for this purpose is made of a correspondingly thick steel sheet, which is bent into a U-shaped frame.

Vehicle seats having safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats, which must therefore also be designed to absorb the tensile forces acting in the case of restraint. The belt retractors themselves have all the basic components of a standard belt retractor and are equipped only with various additional subassemblies provided especially for installation in the backrest, such as a self-aligning inertia sensor.

In its basic design, the vehicle seat has a seat structure consisting of several load-bearing structural parts, which serve to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions so that the vehicle occupant can use the freedom obtained by autonomous driving, for example, for more meaningful communication with the other occupants, for extended and more intensive rest phases or even for work, and can orient the vehicle seat accordingly. As a result, the safety belt device and in particular the belt retractor no longer have to be fastened to the vehicle structure as heretofore but rather to the vehicle seat, as has already been the case, for example, with the front seats of convertibles.

Furthermore, in modern safety belt devices, belt retractors are provided with electric motors, which drive the belt shaft upon activation to a reversible belt tightening in the winding direction, for example. The electric motor is likewise fastened to the frame and is arranged laterally of the belt shaft with a drive shaft oriented in parallel to the axis of rotation of the belt shaft. Furthermore, it is known to provide a gear mechanism between the belt shaft and the electric motor, by means of which gear mechanism the rotational speed of the electric motor is translated into a predetermined rotational speed of the belt shaft. The use of the gear mechanism also makes it possible to use an electric motor that is as compact as possible with a high rotational speed. A belt retractor with an increased installation space requirement is thus produced overall, despite the use of the compact electric motor made possible by the gear mechanism. Such a belt retractor is known, for example, from publication WO 03/0 99 619 A2.

If the belt shaft is to be driven at different rotational speeds and torques, further gear stages must be provided, which further increase the installation space requirement. Such a belt retractor is known, for example, from publication DE 199 27 731 C2.

Since the installation spaces available on the seat structure of the vehicle seats or in general in very small vehicles are very limited in their size and cannot be enlarged as desired for design reasons, the arrangement of such a belt retractor on the vehicle seat or even in a small vehicle is fundamentally problematic.

Against this background, the object of the invention is to provide an improved belt retractor with an electric motor and with a gear mechanism with a reduced installation space requirement.

In order to achieve the object, a belt retractor with the features of Claim 1 is proposed. Further preferred embodiments of the invention can be gathered from the dependent claims, the figures and the associated description.

According to the basic idea of the invention, it is proposed that, in a deactivated state, the gear mechanism can be driven as an assembly for driving the belt shaft with a first torque, and the belt retractor has a first part that, when a pulling force exerted by the safety belt is exceeded, is driven to a rotational movement in a direction of rotation opposite to the direction of rotation of the electric motor, and that a braking device is provided, which brakes the rotational movement of the first part and thereby actuates a blocking device to block a second part of the gear mechanism, wherein by blocking the second part, the blocking device activates the gear mechanism to transmit the rotational movement of the electric motor at a reduction ratio.

In the deactivated state, the gear mechanism as an assembly forms a first force transmission path, in which the rotational movement of the electric motor is transmitted to the belt shaft at 1:1, i.e., without any transmission ratio or reduction ratio. The assembly forms a block that is arranged between the electric motor and the belt shaft and is connected to both parts in a rotationally fixed manner. In the first force transmission path, i.e., when the gear mechanism transmits the rotational movement at 1:1, the safety belt can be actively pulled back into the parking position after unbuckling (winding aid). The drive spring previously used in the belt retractor can thus be supported or even omitted in the extreme case. In this case, the rotational speed of the electric motor is between 100 and 200 rpm, and the safety belt is retracted with a pulling force of approximately 10 to 50 N.

In the second force transmission path, when the gear mechanism is activated, the shaft of the electric motor is driven by a correspondingly higher current supply to a higher rotational speed, which is then in turn reduced by the gear mechanism to a lower rotational speed, so that the safety belt is retracted, for example for a reversible pretightening, with a higher retraction force of approximately 150 to 800 N and in a considerably shorter period of time at a rotational speed of 60 to 10000 rpm. The activation of the gear mechanism and the opening of the second force transmission path take place automatically by exceeding a pulling force predetermined by the design of the gear mechanism and exerted by the safety belt. This predetermined pulling force is exceeded, for example, by the electric motor being operated at a considerably higher rotational speed of approximately 5000 to 30000 rpm, and the belt slack being pulled out abruptly, whereby the pulling force in the safety belt then rises abruptly, and the gear mechanism is activated. In this case, before the activation of the gear mechanism, the first part of the belt retractor rotates in the same direction as the rotational direction of the shaft of the electric motor.

After the rise of the counterforce in the safety belt, the first part initially rotates counter to the direction of rotation of the electric motor in a first step, since further winding of the safety belt is no longer possible, and the driving rotational movement of the electric motor is transmitted to the first part in the reverse direction of rotation via the gear mechanism operating in this phase as a rotational direction reversing gear mechanism. This reverse rotational movement of the first part is then braked by the braking device provided according to the invention, as a result of which the blocking device in turn is actuated to block the second part of the gear mechanism. This blocking of the second part of the gear mechanism then leads to activation of the gear mechanism, and the second force transmission path through the gear mechanism is opened.

As a result, two different functions, namely a comfort function for winding the safety belt into the parking position and a reversible belt tightening in a pre-accident phase can be realized with a single electric motor and a single gear mechanism, without the required installation space being increased as a result. A very compact multi-function belt retractor can thus be created, which, due to its compact design, can preferably be arranged in a backrest and particularly preferably in an upper edge portion of a backrest of a motor vehicle. The blocking of the second part caused exclusively by the brief reversal of the direction of rotation is of particular importance for the solution according to the invention, since it can thereby be prevented that the second part also blocks during the normal driving rotational movement without the reversal of the direction of rotation in the first force transmission path, and the gear mechanism is thus unintentionally activated. The reversal of the direction of rotation is caused by the belt force to be overcome rising abruptly, which is the case when the rotational speed of the electric motor is abruptly increased for reversible pretightening, but the electric motor continues to exert a torque on the gear mechanism. In this case, the gear mechanism practically activates itself by the torque of the electric motor no longer being able to be transmitted to the belt shaft but leading to the reversal of the direction of rotation of the first part of the belt shaft and the blocking, caused thereby, of the second part of the gear mechanism. After the blocking, the blocking device or the blocked second part of the gear mechanism forms the vehicle-fixed support for the gear mechanism in the second force transmission path.

In this case, the gear mechanism can preferably be a reduction gear mechanism, which reduces the rotational movement of the electric motor into a slower rotational movement of the belt shaft. By using such a gear mechanism, the electric motor can preferably be operated at a very much higher rotational speed in order to realize a higher retraction force, which rotational speed is then reduced in the second force transmission path. This makes it possible to use an electric motor that is as compact as possible with a very high rotational speed to realize a compact design of the belt retractor.

It is furthermore proposed that the blocking device is additionally configured to block the belt shaft when a predetermined belt pull-out acceleration and/or vehicle deceleration is exceeded. Due to statutory requirements alone, belt retractors must have a blocking device, which must block the belt shaft in pull-out directions when predetermined limit values of the belt pull-out acceleration and the vehicle deceleration are exceeded. Through the solution according to the invention, the blocking device according to the invention, which is used for switching the gear mechanism, can also be used at the same time to fulfill the statutory requirements. In other words, the already existing blocking device can also be used for switching the gear mechanism. In this case, it is of particular advantage that the actuation movement of the blocking device is only triggered by a reversal of the driving rotational movement of the electric motor, since this makes it possible to use the blocking device particularly easily to realize the belt-strap-sensitive blocking of the belt shaft, which is likewise caused by a movement of a part of the belt retractor (the control disk) in the pull-out direction and by a stopping of the latter.

It is furthermore proposed that the first part is formed by a control disk that forces the movement of the blocking pawl. The control disk has a control contour on which the blocking pawl rests, so that the movement of the blocking pawl is controlled by the movement of the control disk. In this way, the movement of the blocking device and the blocking process per se can not only be triggered but additionally also be defined and controlled in the course.

In this case, the braking device can preferably be signal-controlled, so that the braking process of the first part can be deliberately triggered by an external signal. In this case, the braking device can be activated at the same time as the actuation of the electric motor or after a predetermined time interval after the increase in the rotational speed of the electric motor, so that the movement, forced by the increased belt force, of the first part in the reverse direction of rotation is immediately braked again and the actuation of the blocking device can be caused in the shortest possible period of time. Overall, the required period of time for switching the gear mechanism can thereby be shortened. Furthermore, the signal for actuating the electric motor can of course likewise be used to actuate the braking device, so that both processes are triggered simultaneously.

Furthermore, it is proposed in this case that the control disk has teeth, and the braking device is formed by a blocking lever that can be actuated by a signal to move to engage in the teeth of the control disk. The control disk is stopped or braked in this case by the deflection of the blocking lever, which is supported in a vehicle-fixed manner, into the teeth of the control disk, so that the control disk can subsequently no longer perform the rotational movement, and the blocking pawl is forced to perform the blocking movement.

It is furthermore proposed that the gear mechanism is a planetary gear mechanism. Planetary gear mechanisms are characterized by a compact design with favorable force ratios and enable a high reduction without thereby increasing the external dimensions of the gear mechanism. For designing the planetary gear mechanism, only the diameter ratios of the planetary gears, the sun gear, and the teeth on which the planetary gears roll must be selected accordingly.

In this case, the planetary gear mechanism can preferably be designed such that it has an annular housing connected to the belt shaft in a rotationally fixed manner and having teeth, and the second part of the gear mechanism can be formed by a planetary carrier on which two or more planetary gears having teeth are rotatably mounted, said planetary gears meshing with their teeth in the teeth of the annular housing, and a toothed sun gear driven by the electric motor can be provided, which engages into the teeth of the planetary gears, wherein the sun gear drives the belt shaft, when the gear mechanism is activated, in the second power transmission path via the planetary gears and the annular housing to a rotational movement by blocking the planetary carrier. As a result of the proposed design, a particularly compact planetary gear mechanism and thus also a compact belt retractor can be realized with a simultaneously high reduction of the driving rotational movement of the electric motor. Furthermore, by the blocking of the planetary carrier, the driving rotational movement of the electric motor can be reversed particularly easily.

In this case, the annular housing can preferably be formed by an internally toothed ring gear, and the planetary carrier with the planetary gears and the sun gear driving the planetary gears can preferably be arranged in the ring gear. The ring gear thus forms not only the teeth on which the planetary gears roll, but additionally also a housing, which accommodates the planetary gears, the planetary carrier and the sun wheel, for protecting these parts from the outside.

A particularly compact design with the smallest possible cross section and an elongate shape can be realized in that the belt shaft, the gear mechanism and the electric motor are arranged coaxially and in series with one another.

The invention is explained below using preferred embodiments with reference to the accompanying figures. They show:

FIG. 1 a belt retractor according to the invention having an open housing, and

Figure 2:
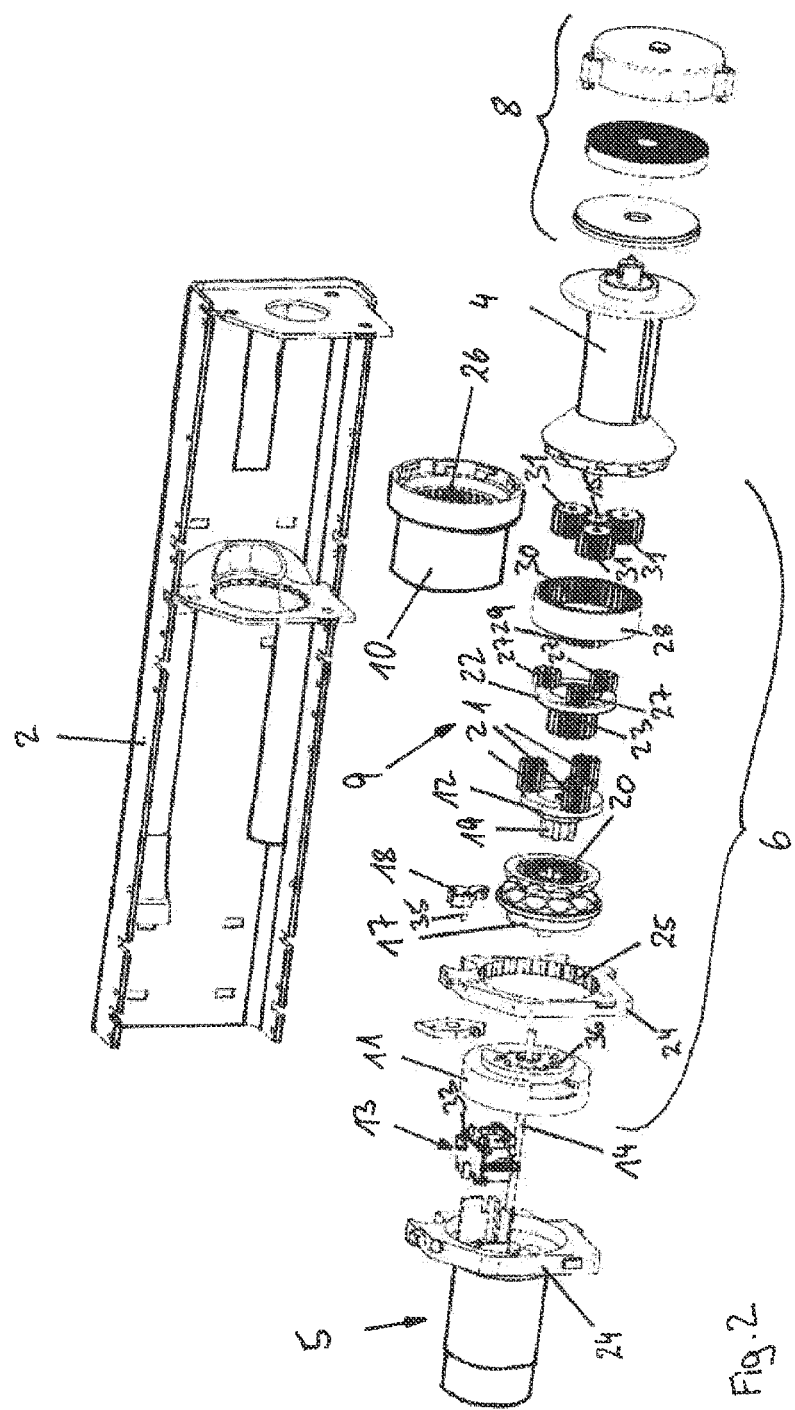
Figure 3:
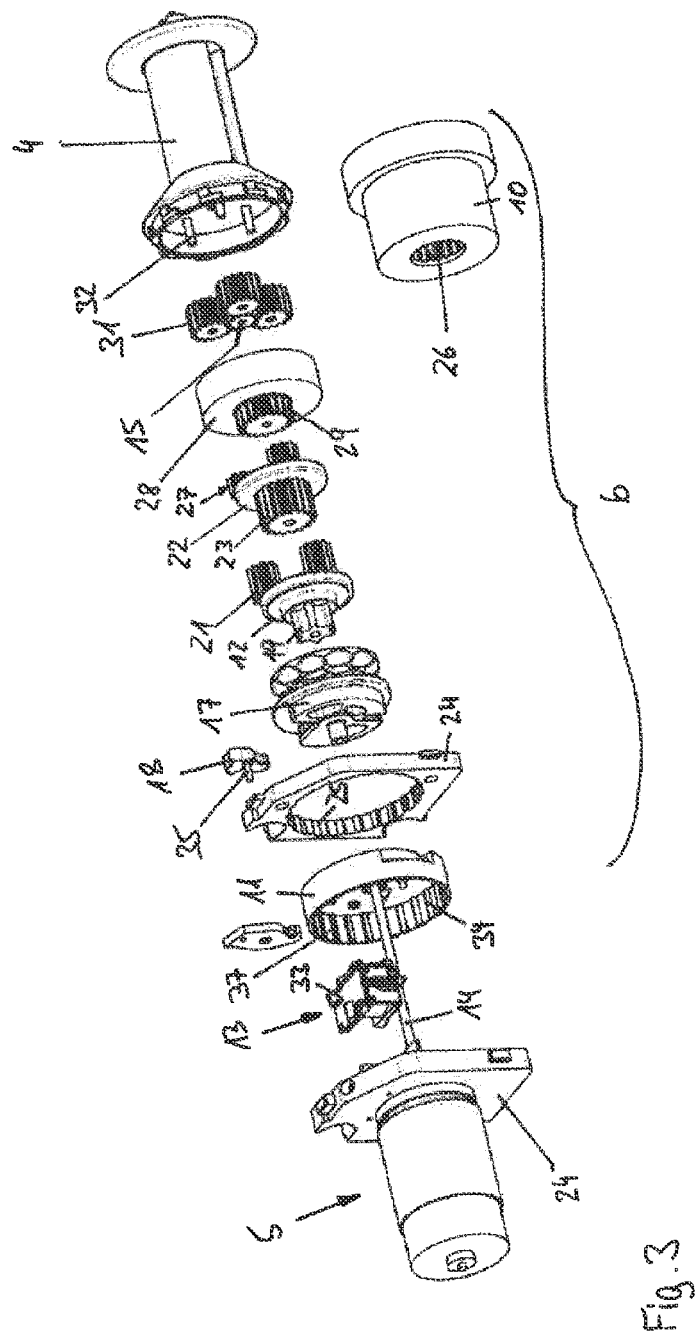
Figure 4:
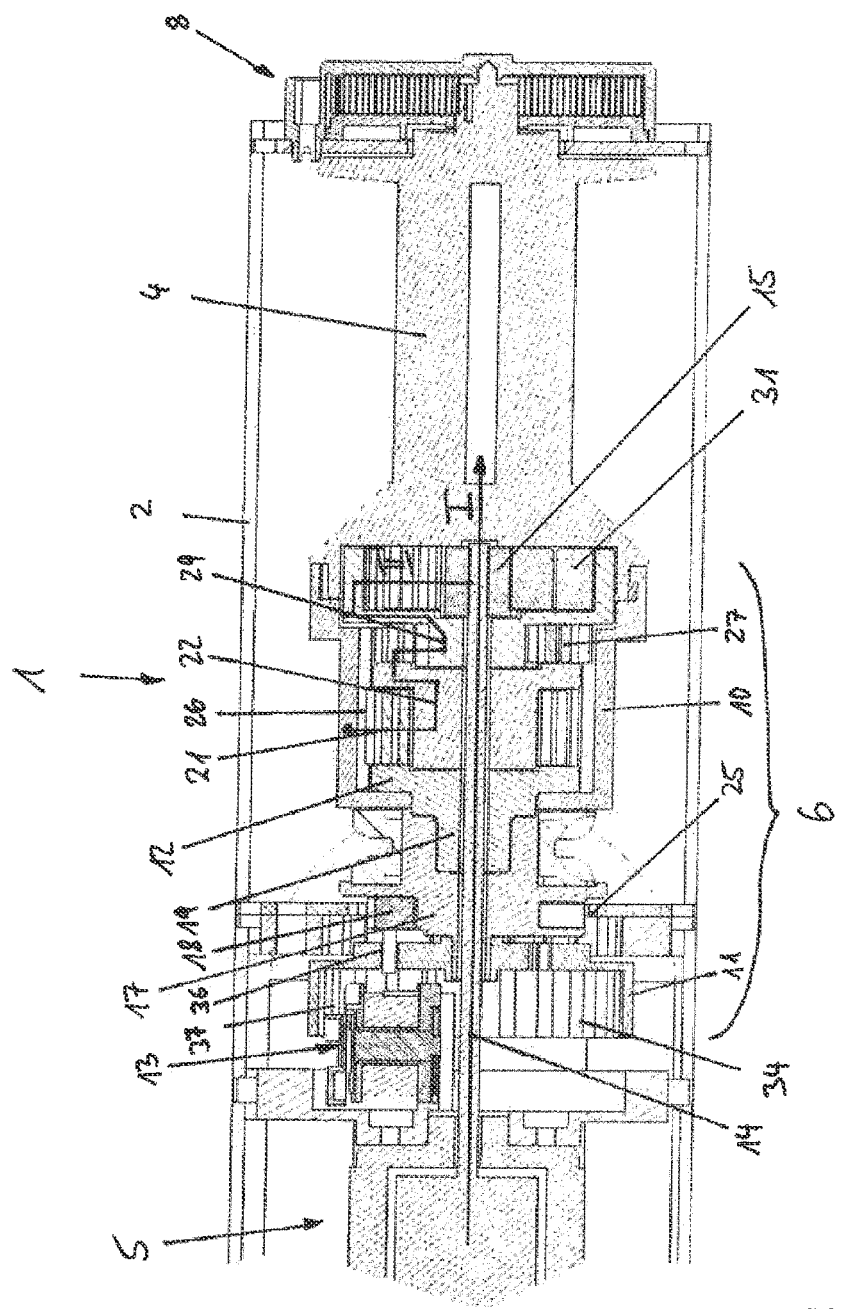

FIG. 2 a belt retractor according to the invention in an exploded view with housing in a first perspective, and FIG. 3 a belt retractor according to the invention in an exploded view without a housing in a second perspective, and FIG. 4 a belt retractor according to the invention in a sectional view.

FIG. 1 shows a belt retractor 1 according to the invention with a housing 2. The housing 2 is formed in two parts and is shown open, without a second part, so that the parts arranged therein can be seen better. The belt retractor 1 has a belt shaft 4, a gear mechanism 6, and an electric motor 5, which are arranged coaxially and in series with one another and thus form a slim elongate structural unit in the housing 2. The components of the belt retractor 1 are mounted by a plurality of webs 24, which are supported on the housing 2 and can additionally have receptacles for further devices, such as sensors, components of an irreversible belt tightener, electrical lines, etc. Furthermore, a drive spring assembly 8 is held on the outside of the face-side web 24 and comprises a drive spring, which is connected to the belt shaft 4 via a spring heart and loads the belt shaft 4 in the retraction direction of the safety belt 3. Furthermore, an irreversible tightening device 7 is provided, which, upon activation via a drive wheel and the gear mechanism 6, drives the belt shaft 4 abruptly with a high tightening power in the winding direction when an immediately imminent accident can no longer be avoided.

FIGS. 2 and 3 show the same belt retractor 1 with and without the housing 2 in an exploded view in two different views. The gear mechanism 6 comprises an annular housing 10, which is designed as a pot-shaped first ring gear with internal teeth 26 and is connected via a bayonet connection to the belt shaft 4 in a rotationally fixed manner in the winding direction of the safety belt 3. The annular housing 10 can thus also be regarded as an annular, internally toothed extension of the belt shaft 4. Furthermore, three axially projecting journals 32, on which three first externally toothed planetary gears 31 are rotatably mounted, are provided on the belt shaft 4. The first planetary gears 31 engage with their teeth radially inward into teeth of a central first sun gear 15, which is connected in a rotationally fixed manner to a shaft 14 of the electric motor 5. Furthermore, the first planetary gears 31 engage radially outward into internal teeth 30 of a second ring gear 28, on which a further axially projecting second sun gear 29 is provided. The belt shaft 4 thus forms a first planetary carrier for holding the first planetary gears 31. The second sun gear 29 is in toothed engagement with three further second planetary gears 27 of a second further planetary carrier 22, which likewise has a further third sun gear 23. The third sun gear 23 is in toothed engagement with a set of three further third planetary gears 21 of a third planetary carrier 12, which is connected in a rotationally fixed manner to a profile head 17 via an externally toothed extension 19. The profile head 17 is also provided radially on the outside with an engagement contour for transmitting the driving movement of the drive device of the irreversible tightening device and thus also forms the tightening drive wheel of the irreversible tightening device 7. Together with the third planetary carrier 12, the profile head 17 forms a rotationally fixed connection. Furthermore, the profile head 17 is a carrier of a blocking device 18 in the form of a pivotably mounted blocking pawl with a projecting pin 35, which blocking pawl is arranged and oriented in such a way that, when upon pivoting out and away from the profile head 17, it turns into teeth 25, fixed to the housing, of one of the webs 24. The teeth of the blocking pawl and the teeth 25, fixed to the housing, in the web 24 are oriented such that the blocking pawl blocks the profile head 17 and thus also the third planetary carrier 12 in the pull-out direction of the safety belt 3 upon engagement into the teeth 25.

Furthermore, a control disk 11 with a plurality of recesses 36 in the form of a respective control contour is provided on the shaft 14 of the electric motor 5. The blocking pawl engages with the pin 35 in one of the recesses 36 and thereby couples the blocking pawl to the control disk 11.

Furthermore, one end of a spring (not shown) is held on the pin 35 of the blocking pawl, which spring is held with the other end on the profile head 17. The spring (not shown) pretensions the blocking pawl in the direction of a position in which it does not engage in the teeth 25, so that the profile head 17 and the third planetary carrier 12, which is connected in a rotationally fixed manner thereto, can rotate freely in relation to the web 24 or the teeth 25 and the housing 2, both in the pull-out direction and in the retraction direction of the safety belt 3 when the spring is relaxed. Furthermore, the spring is designed such that it loads the control disk 11 in the direction of the pull-out direction of the safety belt 3 due to the pin 35 engaging in one of the recesses 36.

The control disk 11 is designed as a third ring gear with internal teeth 34 and has a cavity 37 in which a braking device 13 is arranged. The braking device 13 is designed in the form of a signal-controlled actuator with an electromagnet and a blocking lever 33, which is arranged and oriented such that the blocking lever 33 is forced to pivot out when the electromagnet is energized, as a result of which it is turned into the teeth 34 of the control disk 11 and thereupon brakes or stops the latter in relation to the profile head 17 and the blocking pawl. As a result of this relative movement of the control disk 11 in relation to the profile head 17 and the blocking pawl, the blocking pawl is then forced into a turning-in movement into the teeth 25 of the web 24, as a result of which the profile head 17 and the third planetary carrier 12, which is connected thereto in a rotationally fixed manner, is blocked in the pull-out direction of the safety belt 3. The turning-out movement of the blocking pawl is defined by the shape of the control contour in the control disk 11, in which the blocking pawl engages with the pin 35.

The gear mechanism 6 is thus designed as a three-stage planetary gear mechanism, which, starting from the shaft 14 of the electric motor 5, is driven via the first sun gear 15.

Here, the annular housing 10 is preferably designed as a ring gear with internal teeth 26 and thus additionally serves as a housing that protects the planetary gear mechanism from the outside and in the internal teeth 26 of which the second and third planetary gears 27 and 21 roll. Furthermore, the annular housing 10 also serves to receive the second ring gear 28, in the teeth 30 of which the first planetary gears 31 roll. The annular housing 10 is connected via a bayonet connection to the belt shaft 4 in a rotationally fixed manner in the winding direction of the safety belt 3. The entire gear mechanism 6 can be produced of a lightweight, dimensionally stable plastic material or of a metal or another dimensionally stable material or composite.

FIG. 4 shows the belt retractor 1 in a sectional view. If the safety belt 3 is to be rolled up into a parking position after unbuckling, the electric motor 5 is operated at a low power at a rotational speed of 100 to 200 rpm and with a retraction force of the safety belt 3 of a few newtons. The blocking device 18 in the form of the blocking pawl is deactivated, i.e., the blocking pawl does not engage in the teeth 25, and both the profile head 17 and the third planetary carrier 12, including the entire gear mechanism 6, can rotate freely in relation to the housing 2. The gear mechanism 6 is designed such that it has a low self-locking, which is dimensioned such that the driving rotational movement of the shaft 14 is transmitted via the first sun gear 15 to the belt shaft 4 without the gear mechanism 6 being activated in this case. In the case of the deactivated gear mechanism 6, there is no relative movement between the interlocking gear wheels in the planetary stages of the planetary gear mechanism 9. The rotational movement of the shaft 14 is transmitted to the belt shaft 4 at 1:1. This is in this case made possible, in particular, because the counterforce exerted by the safety belt 3 during winding into the parking position is very small or negligible. In this case, the winding process is additionally supported by the drive spring in the drive spring assembly 8, and the total winding force to be applied for retraction of the safety belt 3 into the parking position is formed in this case by the sum of the pulling force applied by the electric motor 5 and the pulling force of the drive spring. Conversely, as a result of the winding via the electric motor 5, a very much weaker drive spring can be used, without the functional reliability of the winding process into the parking position being compromised as a result. As a result of the weaker drive spring, the wearing comfort of the safety belt 3 in the applied state can be significantly improved, since the occupant simply feels or notices the safety belt 3 less.

If the electric motor 5 is to be tightened for a reversible belt pretensioning in a pre-phase of a possible accident, the safety belt 3 must however be pulled back with a significantly higher tightening force of approximately 150 to 800 N at a rotational speed of 60 to 10000 rpm. This is achieved in that the power of the electric motor 5 is significantly increased by a higher current supply, so that the electric motor 5 drives the shaft 14 in a very short run-up phase at a rotational speed of approximately 5000 to 30000 rpm. This high rotational speed of the shaft 14 is then transmitted via the same force transmission path via the gear mechanism 6 to the belt shaft 4, which in turn results in the existing belt slack being pulled out very quickly with a comparatively small pulling force. Since the safety belt 3 rests against the occupant in this situation, the pulling out of the belt slack immediately leads to a very strong rise in the counterforce exerted by the safety belt 3 when the low pulling force is no longer sufficient to pull further belt slack from the safety belt 3. The driving movement of the belt shaft 4 is thus inhibited or blocked by the counterforce of the safety belt 3 itself, and the annular housing 10 connected to the belt shaft 4 in a rotationally fixed manner can no longer perform the rotational movement. At the same time, however, the drive torque exerted by the shaft 14 via the first sun gear 15 continues to act. Due to the blocked annular housing 10, a further rotational movement of the shaft 14 is only possible by transmitting the driving rotational movement of the first sun gear 15 via the gear mechanism 6 backward to an opposite rotational movement to the third planetary carrier 12, the profile head 17, and the control disk 11. In this phase, the gear mechanism 6 operates as a rotational direction reversing gear mechanism.

Since the first planetary gears 31 can rotate on the journals 32 of the belt shaft 4 but cannot perform any orbital movement in relation to the belt shaft 4, the rotational movement of the first sun gear 15 is already reversed in the first stage of the 3-stage planetary gear mechanism into a reverse direction of rotation of the second ring gear 28. Thus, when the direction of rotation of the electric motor 5 is in the retraction direction of the safety belt 3, the second ring gear 28 rotates instead in the pull-out direction of the safety belt 3 in this phase. This reverse rotational movement of the second ring gear 28 is finally also transmitted, via the further second and third planetary gears 27 and 21 rolling on the teeth 26 of the blocked annular housing 10, and the second and third planetary carriers 22 and 12, via the profile head 17 to the control disk 11.

The braking device 13 is activated at the same time or shortly before the reversal of the direction of rotation, so that the blocking lever 33 is pivoted out and engages in the teeth 34 of the control disk 11. As a result, the beginning rotational movement of the control disk 11 in the pull-out direction is stopped or braked, and the control disk 11 is stopped while tensioning the spring (not shown) in relation to the continuingly rotating profile head 17 and the blocking pawl. This relative movement results in the blocking pawl being forced, due to the pin 35 engaging in the recess 36, to perform a turning-out movement by means of which the blocking pawl comes to engage with its teeth in the teeth 25 of the web 24 and blocks a further rotational movement of the profile head 17 and of the third planetary carrier 12, which is connected thereto in a rotationally fixed manner, in the pull-out direction of the safety belt 3. Subsequently, the third planetary carrier 12 is supported in a vehicle-fixed manner via the blocking device on the housing 2 of the belt retractor 1. The third planetary gears 21 on the third planetary carrier 12 can thus still perform a rotational movement about their axes of rotation, but an orbital movement of the planetary gears 21 is no longer possible. This leads to a further reversal of the direction of rotation, so that the annular housing 10 and the belt shaft 4, which is connected thereto in a rotationally fixed manner, are driven via the continuingly rotating third planetary gears 21 to a rotational movement in the retraction direction of the safety belt 3. The gear mechanism 6 is thus activated and the rotational movement of the shaft 14 of the electric motor 5 of approximately 5000 to 30000 rpm is reduced to a rotational speed of 60 to 10000 rpm at a transmission ratio of i=30 to 80. Due to the reduction of the rotational movement, the torque and the retraction force acting on the safety belt 3 are simultaneously increased to 150 to 800 N.

In this case, the blocking device 18 is a blocking pawl, which can additionally also be used for blocking the belt shaft 4 in the pull-out direction when a suitable sensor device determines that a predetermined belt pull-out acceleration or vehicle deceleration has been exceeded.

In the present exemplary embodiment, the braking device 13 has a blocking lever 33, which turns into the teeth 34 of the control disk 11 and thereupon stops the latter in relation to the profile head 17. This embodiment is advantageous in that the rotational movement of the control disk 11 can be stopped, i.e., braked to zero, very quickly. However, it is also conceivable to provide other braking devices 13, which must only be able to stop or brake the rotational movement that has started of the control disk 11 in the pull-out direction of the safety belt 3 and thereby force a relative movement of the control disk 11 in relation to the profile head 17. Such braking devices 13 can also be formed, for example, by friction brakes or similar devices.

The advantage of the solution according to the invention can be seen in that the belt retractor 1 with the electric motor 5 makes it possible to realize two functions, namely a comfort function for winding the safety belt 3 into the parking position and a reversible belt tightening with two retraction forces that differ significantly from one another, at a lower and a higher force level, without thereby increasing required installation space. In this case, a gear mechanism 6 is used, which does not only enable the drive rotational speed of the electric motor 5 to be reduced. In addition, the gear mechanism 6 is itself used for the switching from the comfort function to the function of reversible belt tightening by causing or triggering the blocking and thus the switching of the blocking device 18 by the deliberately caused reversal of the direction of rotation. This switching of the blocking device 18 then causes the belt shaft 4 to be subsequently driven again in the desired winding direction as a result of another reversal of the direction of rotation. The gear mechanism 6 practically switches itself when the braking device 13 is activated. In this case, the self-locking of the gear mechanism 6 is deliberately utilized to drive the entire gear mechanism 6 as a block during the comfort function and the retraction of the safety belt 3 with the very low force of a few newtons. The shifting of the gear mechanism 6 is then only initiated and triggered when a counterforce predetermined by the self-locking of the gear mechanism 6 is exceeded, in that the torque applied by the electric motor 5 is no longer sufficient to drive the belt shaft 4 in the winding direction, but that, instead, the rotational movement is transmitted back into the gear mechanism 6 in the reverse direction, as described above.

An already existing blocking pawl can in this case be used as the blocking device 18, so that the additional costs arising from the realization of the additional function can be reduced. Furthermore, a controllable actuator, which additionally actuates the blocking device 18 when a predetermined belt pull-out acceleration or vehicle deceleration is exceeded, can also be used as the braking device 13.

Here, the control disk 11 forms the first part, which is driven according to the above-described sequence to a rotational movement in a direction of rotation opposite the driving rotational movement of the electric motor 5, when the pulling force exerted by the safety belt 3 rises. In this case, the control disk 11 is still taken along in the direction of the driving direction of rotation of the electric motor 5 as a result of the spring load before the rise of the pulling force of the safety belt. Only this reversal of the direction of rotation then enables, as a result of the activation of the braking device 13 and the braking or stopping, caused thereby, of the control disk 11, the triggering of the blocking movement of the blocking device 18. This initially ensures that the blocking device 18 is not unintentionally activated during the rotation of the control disk 11 in the winding direction of the safety belt 3 for rolling up into the parking position. The second part blocked by the blocking device 18 in the unwinding direction is then the third planetary carrier 12, which then, in the blocked position, drives the annular housing 10 and the belt shaft by the rotation of its third planetary gears 21 in the winding direction. Thus, the functional change from the function of the electric motor 5 as a winding aid after unbuckling to the function as a reversible belt tightener is based on a double reversal of the direction of rotation, namely initially a first reversal of the direction of rotation of the control disk 11 or of the second ring gear 28 from the winding direction of the safety belt 3 into the pull-out direction of the safety belt 3. This first reversal of the direction of rotation causes the second part, in this case the third planetary carrier 12, to be blocked. Subsequently, a second reversal of the direction of rotation on the blocked third planetary carrier 12 again into the retraction direction of the safety belt 3 takes place. In this way, the driving rotational movement of the electric motor 5 in the gear mechanism 6 is reversed twice in its direction of rotation and is additionally reduced by the planetary stages to a considerably lower rotational speed of the belt shaft 4 but with an increased retraction force.

The invention claimed is:

1. A belt retractor comprising
   a belt shaft that is rotatably mounted in a housing that can be fastened in a vehicle-fixed manner and onto which a safety belt can be wound, and
   an electric motor for driving the belt shaft to a rotational movement, and
   a gear mechanism that transmits the rotational movement from the electric motor to the belt shaft, wherein
   when it is deactivated, the gear mechanism can be driven with a first torque as an assembly for driving the belt shaft, and
   the belt retractor has a first part that is driven to a rotational movement in a direction of rotation opposite to the direction of rotation of the electric motor when a pulling force exerted by the safety belt is exceeded, and that
   a braking device is provided, which brakes the rotational movement of the first part and as a result actuates a blocking device to block a second part of the gear mechanism, wherein
   by blocking the second part, the blocking device activates the gear mechanism to transmit the rotational movement of the electric motor at a reduction ratio to the belt shaft.

2. The belt retractor according to claim 1, wherein
   the gear mechanism is a reduction gear mechanism that reduces the rotational movement of the electric motor into a slower rotational movement of the belt shaft.

3. The belt retractor according to claim 1, wherein
   the blocking device is configured to block the belt shaft when a predetermined belt pull-out acceleration and/or vehicle deceleration is exceeded.

4. The belt retractor according to claim 3, wherein
   the first part is formed by a control disk that forces the movement of the blocking device.

5. The belt retractor according to claim 1, wherein
   the braking device is signal-controlled.

6. The belt retractor according to claim 4 and according to claim 5, wherein
   the control disk has teeth, and the braking device has a blocking lever that can be actuated by a signal to move to engage into the teeth of the control disk.

7. The belt retractor according to claim 1, wherein
   the gear mechanism is a planetary gear mechanism.

8. The belt retractor according to claim 7, wherein
the planetary gear mechanism has an annular housing connected to the belt shaft in a rotationally fixed manner and having teeth, and the second part of the gear mechanism is formed by a planetary carrier on which two or more planetary gears having teeth are rotatably mounted, said planetary gears meshing with their teeth in the teeth of the annular housing, and that
a toothed sun gear driven by the electric motor is provided and engages into the teeth of the planetary gears, wherein
the sun gear drives the belt shaft, when the gear mechanism is activated, in the second power transmission path via the planetary gears, the annular housing to a rotational movement while being supported on the planetary carrier blocked by the blocking device.

9. The belt retractor according to claim 8, wherein
the annular housing is formed by an internally toothed ring gear, and
the planetary carrier having the planetary gears and the sun gear driving the planetary gears are arranged in the ring gear.

10. The belt retractor according to claim 1, wherein
the belt shaft, the gear mechanism, and the electric motor are arranged coaxially and in series with one another.

* * * * *